United States Patent [19]
Jaeger et al.

[11] Patent Number: 5,566,257
[45] Date of Patent: Oct. 15, 1996

[54] ELECTRO-OPTIC MODULATOR

[75] Inventors: Nicolas A. F. Jaeger, Vancouver; Farnoosh Rahmatian-Dowlatabadi, West Vancouver, both of Canada

[73] Assignee: The University Of British Columbia, Vancouver, Canada

[21] Appl. No.: 487,769

[22] Filed: Jun. 8, 1995

[51] Int. Cl.$^6$ .................................................. G02F 1/035
[52] U.S. Cl. ............................................... 385/2; 385/4
[58] Field of Search ................. 385/2–8, 37, 14, 385/40, 122, 142, 130, 141, 41; 372/102

[56] References Cited

U.S. PATENT DOCUMENTS

| | | | |
|---|---|---|---|
| 4,793,677 | 12/1988 | Adama et al. | 385/2 |
| 4,807,952 | 2/1989 | Jaeger et al. | 385/8 |
| 4,866,406 | 9/1989 | Minakata et al. | 385/8 |
| 4,867,516 | 9/1989 | Baken | 385/3 |
| 5,150,436 | 9/1992 | Jaeger et al. | 385/2 |
| 5,276,745 | 1/1994 | Revelli, Jr. | 385/14 |
| 5,347,608 | 9/1994 | Nakamura et al. | 385/130 |
| 5,455,876 | 10/1995 | Hopfer et al. | 385/2 |
| 5,488,681 | 1/1996 | Deacon et al. | 385/16 |
| 5,491,762 | 2/1996 | Deacon et al. | 385/37 |
| 5,504,772 | 4/1996 | Deacon et al. | 372/102 |

*Primary Examiner*—Akm E. Ullah
*Attorney, Agent, or Firm*—C. A. Rowley

[57] ABSTRACT

An electro-optic modulator/mode-converter with slow wave electrode is formed on a semiconductor substrate incorporating a waveguide interposed between a pair of spaced parallel conductor strips each provided with fins projected toward the other electrode and in position relative to the waveguide to electro-optically affect the waveguide when voltage is applied to the conductor strips. The modulator requires significantly less power and operates at higher frequency than Mach-Zehnder type slow wave modulators.

21 Claims, 5 Drawing Sheets

ELECTRO-OPTIC MODULATOR

FIELD OF INVENTION

The present invention relates to an electro-optic modulator, more particularly, the present invention relates to an electro-optic modulator including a slow wave electrode structure.

BACKGROUND OF THE INVENTION

As discussed in the Applicant's earlier U.S. Pat. No. 5,150,436 issued Sep. 22, 1992, to Jaeger et al. in optical communication systems and high speed signal processing systems slow wave electro-optic waveguide modulators with low power consumption are important elements of an overall system.

The above identified Jaeger et al. patent, discloses specific slow wave electrode configurations employing a pair of parallel electrodes used in combination with a pair of parallel waveguides formed for example, in gallium arsenide (GaAs) or indium phosphide (InP) based compound semiconductors. The waveguides and electrodes are suitably positioned in interactive relationship so that the electro-optic effect of the waveguide is changed significantly as the voltages on the conductor strips are changed.

BRIEF DESCRIPTION OF THE PRESENT INVENTION

It is an object of the invention to provide an improved modulator capable of operating at low power loss and at higher frequency than previous slow wave systems.

Broadly, the present invention relates to an electro-optic modulator comprising a semiconductor substrate, a waveguide having a longitudinal axis formed in said substrate, a pair of spaced electrode means having their longitudinal axes substantially parallel to said longitudinal axis of said waveguide, a first electrode means of said pair of electrodes means positioned at least substantially to one side of said waveguide and a second electrode means of said pair of electrode means positioned on a side of said waveguide opposite said one side, said first electrode means having a first conductor strip and a first set of a plurality of first current conducting fin means spaced along said longitudinal axis of said first electrode means, each of said fin means of said first set of fin means being integral with and extending from said first conductor strip toward said second electrode means, ends of said first set of fin means remote from said first conductor strip being positioned in overlying relationship with said waveguide or on said one side of said waveguide, said second electrode means having a second conductor strip and a second set of a second plurality of second current conducting fin means spaced along said longitudinal axis of said second electrode means, each of said fin means of said second set of fin means being integral with and extending from said second conductor strip toward said first electrode means, ends of said fin means of said second set of fin means positioned on said side of said waveguide opposite said one side, said first and second fin means being positioned relative to said waveguide to induce electro-optic action in said waveguide when voltage is applied to said electrode means.

Preferably, each of said fin means comprises a narrow fin extending from its conductor strip and a pad at its end remote from its said conductor strip, said pad terminating in an end edge remote from its said conductor strip, said end edge remote from said conductor strip being adjacent to said waveguide and substantially parallel to said longitudinal axis of said waveguide.

Preferably fin means of said first set of fins will be symmetrically positioned directly opposite to fin means of said second set of fin means on opposite sides of said longitudinal axis of said waveguide.

Preferably the length of each said pad measured in the direction of said longitudinal axis of said waveguide will be substantially equal to between 40 and 60% of the length of spacing between the centers of adjacent fins of a set of said fin means measured in said longitudinal direction of said waveguide Preferably, said waveguide is a ridge waveguide formed in a raised portion of said substrate, said raised portion being substantially parallel to said longitudinal axis and positioned between and in close relationship with end edges of said first and second sets of fin means remote from their respective said conductor strips.

Preferably, said end edges of said pads remote from said conductor strips of one set of fins are positioned adjacent to one side of said ridge waveguide and said end edges of said pads remote from said conductor strip of said second set of fin means are directly opposite said end edges of said pads of said one set of fins and are adjacent to a side of said ridge waveguide opposite said one side of said ridge waveguide.

Preferably, said substrate is formed of AlGaAs/GaAs or InGaAsP/InP.

Preferably, an optical buffer layer is interposed between said electrode means and said substrate.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
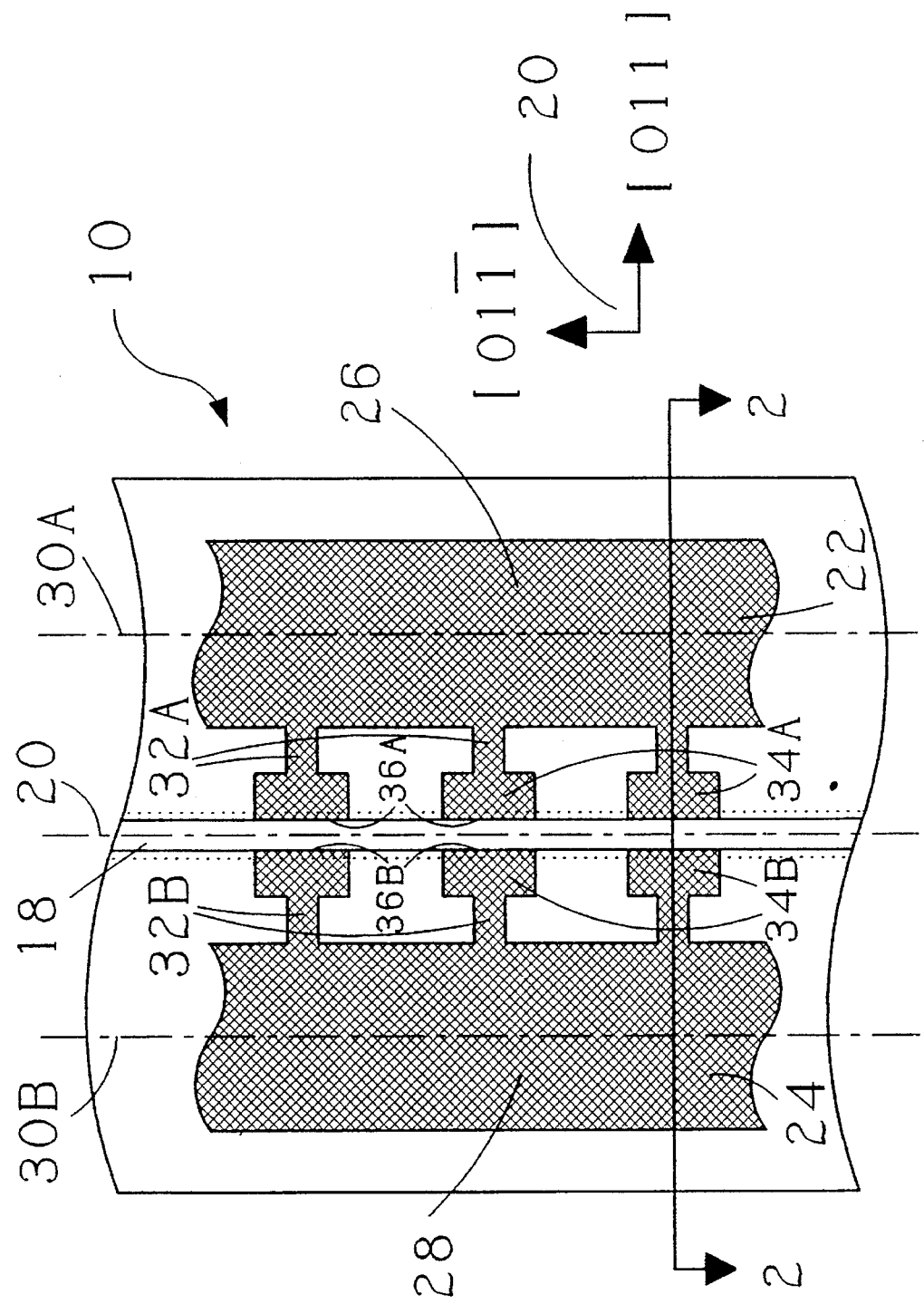
FIG. 1 is a plan view of a portion of an electro-optic modulator/mode-converter, using slow wave electrodes constructed in accordance with the present invention.
Figure 2:
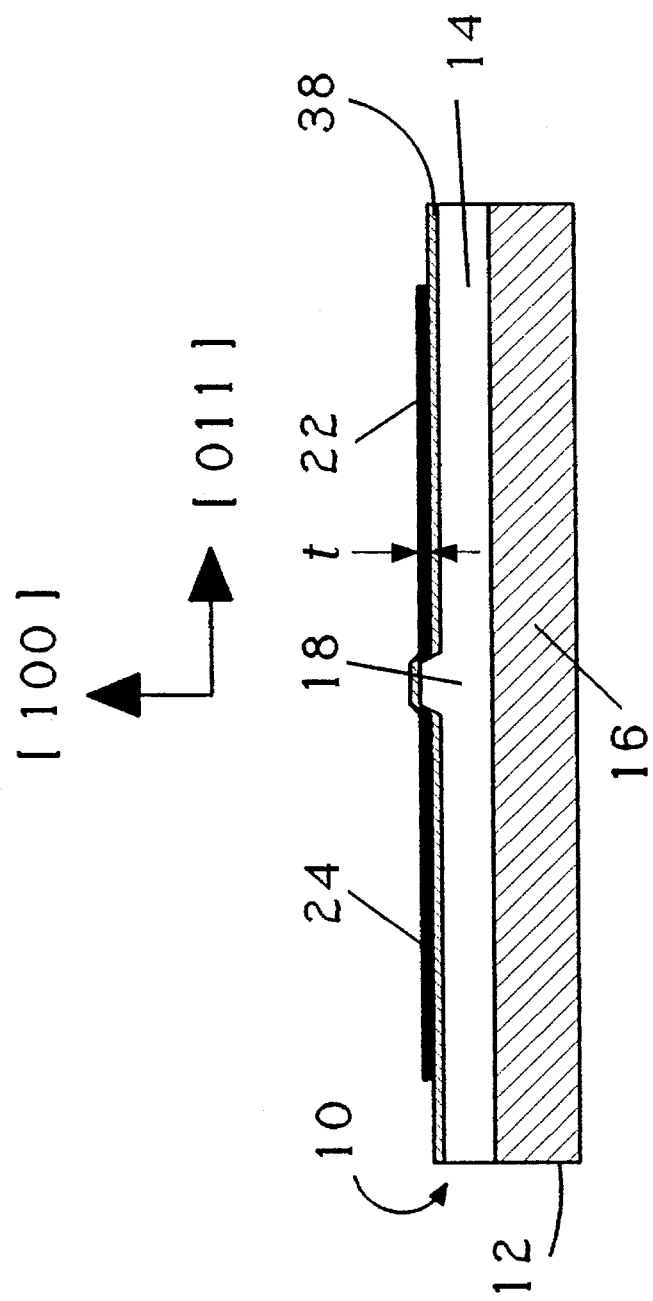
FIG. 2 is a section along the line 2—2 of FIG. 1.

As shown in FIGS. 1 and 2, the modulator 10 of the present invention includes a substrate 12 particularly, a compound semiconductor substrate, preferably made of aluminum gallium arsenide/gallium arsenide (AlGaAs/GaAs) or alternatively indium gallium arsenide phosphide/indium phosphide forming the epitaxial (Epi) layer 14 where the Epi layer is designed to form an optical waveguide and semi-insulating (S.I) layer 16.

A ridge waveguide 18 is fabricated preferably on a (100) or equivalent substrate with a longitudinal axis 20 of the waveguide substantially parallel to the [01$\bar{1}$] or equivalent crystallographic direction as shown in FIG. 1.

A pair of slow wave electrodes 22 and 24, each of which is formed by a flat or planar conductor strip 26 or 28 respectively having a thickness t, and having their longitudinal axis 30A and 30B substantially parallel to the longitudinal axis 20 of the raised waveguide 18. Each of the slow wave electrodes 22 and 24 is provided with its own set of fins. Each set of fins in the preferred embodiment will be composed of a plurality of discrete fins 32A or 32B on slow wave electrode 22 or 24 respectively, For convenience and expediency the corresponding elements on slow wave electrodes 22 and 24 are indicated by the same reference numeral followed by the letter A for electrode 22 and B for electrode 24, thus, only the electrode 22 need be described. However, even though the illustrated and preferred embodiment shows a substantially symmetrical pair of electrodes this type of structure is not essential to carry out the concept of the invention. For example, the fins on the two electrodes need not be identical nor is it absolutely essential that they be directly opposite one another. Furthermore though the illustrated embodiments use two electrodes, it is possible using current knowledge to incorporate a third electrode into the modulator structure.

In the preferred arrangement, each of the fins 32A will be provided with a pad 34A at its end remote from the conductor strip 26. The free end edge 36A of the pad 34A will be substantially parallel to the longitudinal axes 20, 30A and 30B and will be positioned immediately adjacent to the side of the ridge waveguide 18.

While the above described structure with pads 34A and 34B is the preferred arrangement, other arrangement of the fins may be used, for example, the fins may be arranged as described in the said U.S. Pat. No. 5,150,436, Jaeger et al. the contents of which are incorporated herein by reference. For example, the fin spacing need not be constant over the full length of the electrode for example the fins may be closely spaced at one end of the electrode and more widely spaced at the oppose end with intermediate portion of the electrode having fin spacing intermediate the close and wide spacing.

With the present invention a single waveguide replaces the two waveguides of U.S. Pat. No. 5,150,436 and is positioned adjacent to the free ends of the fins 32A and 32B (or of the pads 34A and 34B) so that the fins as opposed to the conductor strips are adjacent to the waveguide and apply the electro-optic effects to the waveguide when the voltage of the electrodes 22 and 24 is changed.

It is not essential that the electrode structure of the present invention be used with a raised waveguide or ridge type waveguide. It is also possible (but not preferred) to use a planar surface semiconductor substrate with the waveguide formed therein in position adjacent to the ends of the fins 32A or 32B (or of the pads 34A or 34B) using the ends 36A or 36B positioned to influence the electro-optic effect of the waveguide thereby influencing the light passing there through. It is preferred that the ends of the fins 32a and 32B or pads 34A and 34B of the two sets be on opposite sides of the waveguide, but if desired the ends of the fins or pads of one of the sets may overlie the waveguide 18.

It is also preferred to provide an optical buffer layer as indicated at 38 between the electrodes 22 and 24 and the substrate 12 (see FIG. 2).

Figure 3:
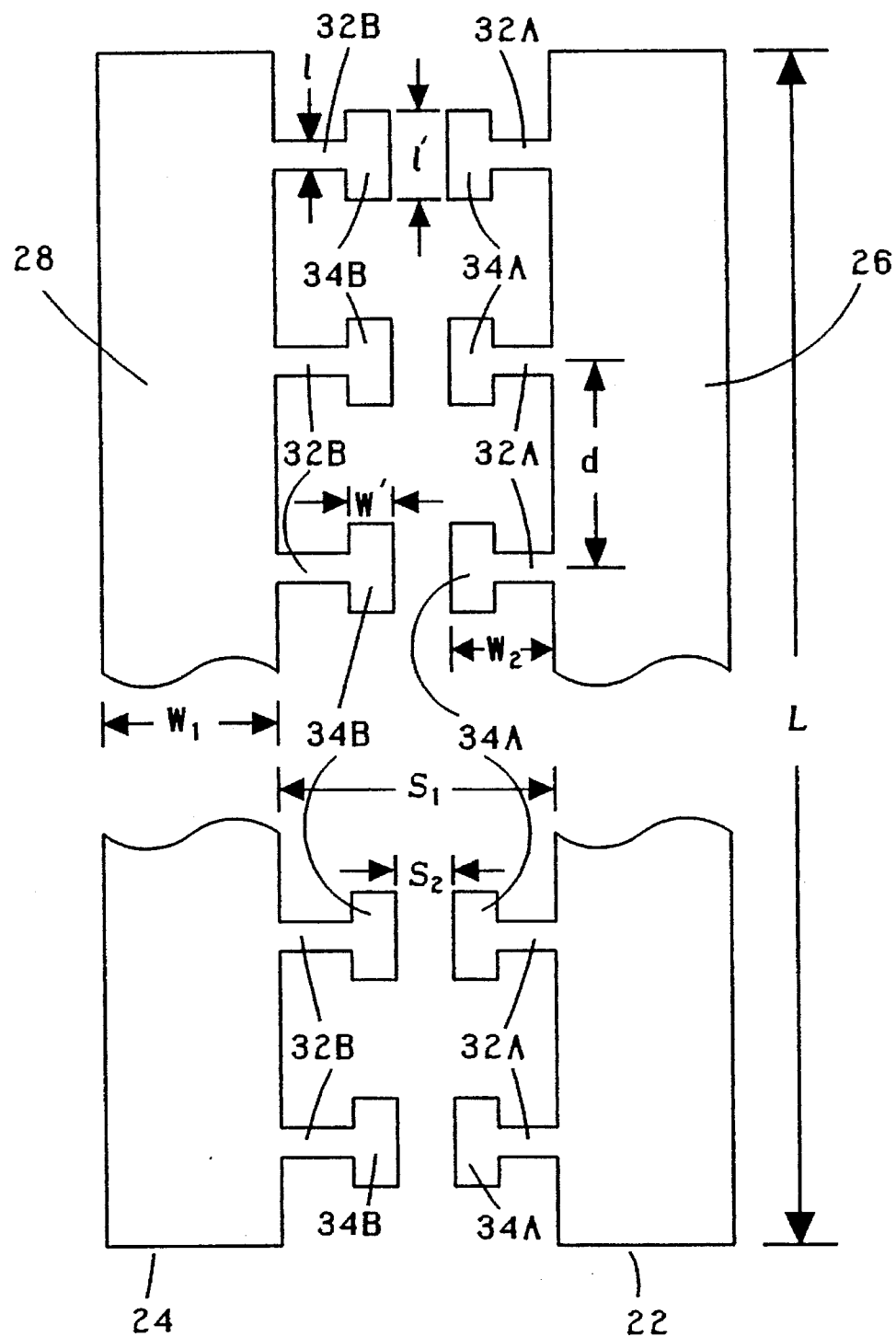
FIG. 3 is a schematic plan view of a pair of slow wave electrodes defining the dimension parameters thereof.

The designations for the specific dimensions of the electrodes are indicated in FIG. 3. As shown, the lengths are measured parallel to the axes 20, 30A and 30B of the electrode and the widths are measured perpendicular to the axes 20, 30A and 30B. The overall length=L, the width of each of the conductor strips 26 and 28=$W_2$, the fin axial length (a width measurement) of the fins 32A or 32B=$W_2$ and the width of the pads 34A and 34B=W', the length of the fins=1, and the length of the pads 34A and 34B=1' while the distance between adjacent fins=d.

The other important dimensions are the distance between the adjacent edges of the two conductor strips 26 and 28 of the two electrodes 22 and 24=$S_1$, and the distance or the spacing between the adjacent edges 36A and 36B of each pair of opposed fins 32A and 32B=$S_2$.

In the preferred arrangement, the length 1' will normally be between 40 and 60% of the length d and depending on the frequencies or other design considerations may have relationship with d outside of the 40 to 60% range.

The sizes or dimensions of the various lengths and widths will be set by engineering the electrodes to attain the required velocity matching as discussed for example in the said U.S. Pat. No. 5,150,436. The change in capacitance per unit length due to the inclusion of the fins (with or without pads) is determined on the basis of the fin spacing d, fin gap $S_2$, fin width $W_2$, (pad width W'), fin length 1 (pad length 1') and the thickness t of the fins and conductor strip as well as the dielectric constant of the substrate and the thickness of the optical buffer layer 38 if one is used.

Typical dimensions for a system are thickness t of about 1 μm, 1=3 to 5 μm, $S_1$=35 to 70 μm, $S_2$=3 to 6 μm, $W_2$=15 to 35 μm. When pads are used, it is typical to have 1'~d/2, with d being normally in the range of about 15 μm to about 40 μm. W' will normally be between 5 and 20 μm and 1' will normally be in the range of about 3 μm to 25 μm.

The ridge waveguide 18 may be fabricated on a (100) cut substrate parallel to the [01$\bar{1}$] crystallographic direction so that the voltage applied to the electrodes creates an electric field parallel to the [011] direction and the refractive indices of the ridge will be $$n[\sqrt{2}11] = n_{o1} + \Delta n.$$
$$n[\sqrt{2}11] = n_{o2} - \Delta n$$
$$n[01\bar{1}] = n_{o3}$$

where $n_{o1}$ $n_{o2}$, and $n_{o3}$ are the refractive indices when no electric field is applied and $\Delta n$ is the electro-optically induced change in refractive index. Other equivalent embodiments arising from the crystallographic considerations will be apparent to those skilled in the art.

A TE-like mode supported by the waveguide will have its electric field essentially parallel to the surface and perpendicular to the direction of propagation. Similarly a TM-like mode supported by the waveguide will have its magnetic field essentially parallel to the surface and perpendicular to the direction of propagation. The application of an electric field parallel to the [011] direction will couple light from a TE-like mode of the waveguide to a TM-like mode of the waveguide, or vice versa. Due to the electro-optic effect the device functions as a mode-converter and can be used as a modulator. Preferably the waveguide will be made to support only the lowest order TE-like and the lowest order TM-like modes.

Further modifications can improve the performance of the modulator. For example, specially designed polarizers can be included at the input and/or output of the waveguide, e.g. such a polarizer, integrated with the mode-converter at the input of the waveguide, can improve the extinction ratio (on/off ratio).

EXAMPLE

A batch of electrodes were designed and fabricated on semi-insulating gallium arsenide substrates at the University of British Columbia (UBC) in Vancouver, British Columbia. They were tested at the Communication Research Center (CRC) in Ottawa, Ontario. The source had a 50 Ω impedance and the electrodes were terminated with a 50 Ω load. Scattering parameters $s_{11}$, $s_{21}$, $s_{12}$, and $S_{22}$ were measured for the electrodes from 100 MHz up to 40 GHz. The input power was 0 dBm (1 mW). The values of the characteristic impedance $Z_0$, attenuation coefficient α, and microwave index $n_\mu$, were calculated from measured scattering parameters (see R. Spickermann et al. "Experimental analysis of millimeter wave coplanar waveguide slow wave structures on GaAs" IEEE Trans. Microwave Theory Tech., vol. 42 no. 10 pp 1918–1924, 1994 and the text book R.E. Coilin, "Foundation for Microwave Engineering" second edition, New York: McGraw-Hill 1992, pp. 551–557) for several electrodes using the following relations:

$$Z_0 = Z_{0R} \frac{(1+s_{11})(1+s_{22}) - s_{12}s_{21}}{s_{22} - s_{11} \pm \sqrt{(1+s_{12}s_{21} - s_{11}s_{22})^2 - 4s_{21}}} \quad (1)$$

$$\alpha + j\beta = \frac{1}{L} \ln\left( \frac{1+s_{12}s_{21} - s_{11}s_{22}}{2s_{21}} \pm \sqrt{\left(\frac{1+s_{12}s_{21} - s_{11}s_{22}}{2s_{21}}\right)^2 - 1} \right) \quad (2)$$

and $$n_\mu = \frac{c\beta}{2\pi f} \quad (3)$$

where $Z_{oR}$=the impedance reference (=50 Ω here)

$L$=the length of the electrode $j = \sqrt{-1}$ $\beta$=the microwave propagation constant $c$ =the speed of light in vacuum, and $f$=the frequency of the microwave signal.

for equation (1) the solution for which $\text{Re}\{Z_0\}$ (real part of $Z_o$) is positive is chosen and similarly, for equation (2), the solution giving a positive α is chosen.

Table I gives examples of device geometry and measurement results. Here, no optical buffer layer was deposited between the substrate and the electrodes, and the substrate was flat, i.e. no ridge waveguide was present. The optical effective refractive index, n, in a typical graded index AlGaAs/GaAs waveguide is about 3.2. The microwave index, $n_\mu$, for a conventional, thin, surface-deposited, coplanar electrode on GaAs is about 2.6. To achieve optical/microwave velocity-match an $n_\mu$ almost equal to n is required. These experiments show that slowing of the microwave signal can be achieved and that these electrodes can have low power loss. Different combinations of optical buffer layer thickness, ridge height, material permittivities, etc. will affect the final design.

Figure 4:
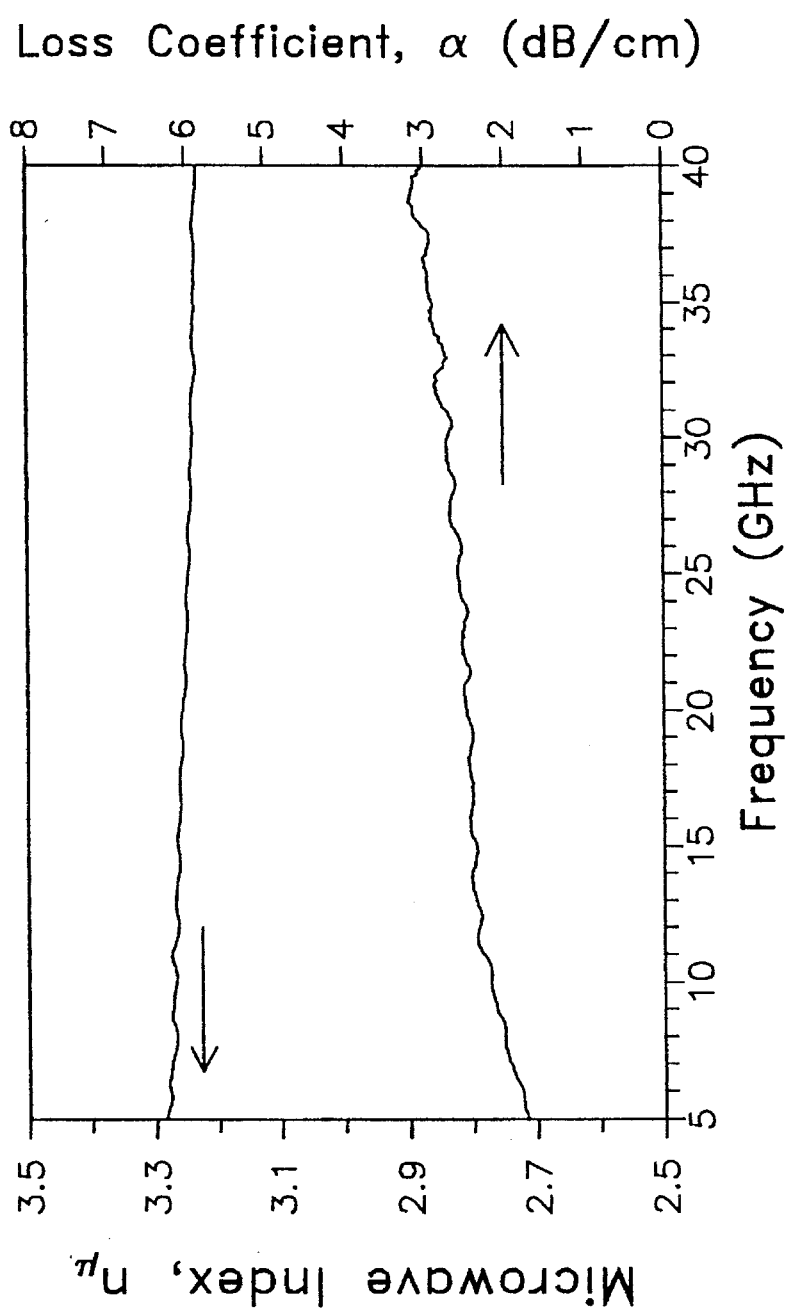
FIG. 4 is a plot of microwave index ($n_\mu$) and attenuation coefficient ($\alpha$) as a function of frequency for electrode No. 1 in Table I.
Figure 5:
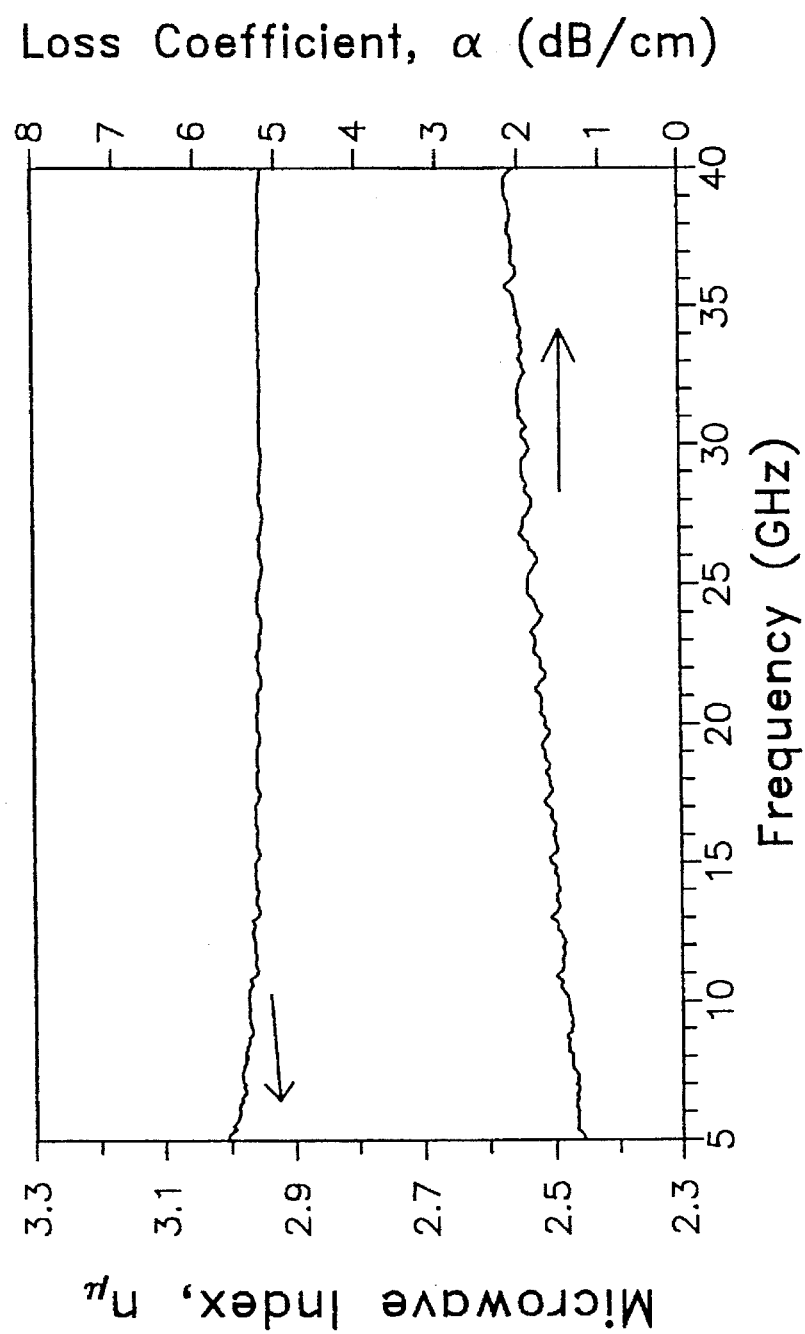
FIG. 5 is a plot of microwave index ($n_\mu$) and attenuation coefficient ($\alpha$) as a function of frequency for electrode No. 2 in Table I.

FIG. 4 shows $n_\mu$ and α for electrode 1 of Table I, similarly, FIG. 5 shows $n_\mu$ and α for electrode 2. Since the higher frequency response of electrodes is of the most interest, the plots are done for the 5 GHz to 40 GHz range. At frequencies lower than 5 GHz, velocity-matching is less important.

TABLE I

Electrode Dimensions
($l = 1.5$ μm and $S_2 = 2$ μm for all electrodes)

| Electrode # | Length (mm) | W1 (μm) | W2 (μm) | W' (μm) | l' (μm) | d (μm) | $n_\mu$ (at 40 GHz) | $|\bar{Z}_0|$ (Ω) |
|---|---|---|---|---|---|---|---|---|
| 1 | 22 | 29.5 | 7.5 | 3.5 | 6 | 12.5 | 3.25 | 62 |
| 2 | 22 | 65.5 | 7.5 | 3.5 | 6 | 25 | 2.96 | 57 | where $|\bar{Z}_0|$ = the magnitude of the average characteristic impedance of an electrode Electrode losses measured indicate that a 3–dB optical bandwidth in excess of 200 GHz, on a 2 cm long device, may be obtained, if velocity-matching occurs.

One advantage of the proposed modulator, using a single straight waveguide, is that the optical losses are less than those in Mach-Zehnder type modulators since in the present invention no Y-branches are present.

Another advantage of the modulator of the present invention over Mach-Zehnder type modulators is that the gap $S_1$ and the electrode width $W_1$ of the coplanar strips can be very wide resulting in lower microwave losses.

Also, in Mach-Zehnder type modulators the coplanar strip electrodes are usually placed on top or immediately next to the waveguide whereby the minimum distance $S_1$ between electrodes is limited by how close together the two waveguides can be placed without evanescent coupling between the two branches. This distance is typically larger than 10 μm when operating at a wavelength of λ=1.3 μm. The present invention employing a single ridge waveguide design allows the gap between the pads to be as small as the waveguide width while allowing the gap between the coplanar strips to be large, i.e. in the order of about 4 μm for a λ=1.3 which significantly reduces the power needed for the microwave source to modulate the light, i.e. the power requirements will be down by an order of magnitude by the reduction in the half-wave voltage $V_\pi$.

It will be apparent that the present invention provides very significant advantages over the prior art.

Having described the invention, modifications will be evident to those skilled in the art without departing from the scope of the invention as defined in the appended claims.

We claim:

1. An electro-optic modulator comprising a semiconductor substrate, a waveguide having a longitudinal axis formed in said substrate, a pair of spaced electrode means having their longitudinal axes substantially parallel to said longitudinal axis of said waveguide, a first electrode means of said pair of electrode means positioned to one side of said waveguide and a second electrode means of said pair of electrode means positioned to a side of said waveguide opposite said one side, said first electrode means having a first conductor strip and a first set of a plurality of first current conducting fin means spaced along said longitudinal axis of said first electrode means, each of said fin means of said first set of fin means being integral with and extending from said first conductor strip toward said second electrode means, ends of said first set of fin means remote from said first conductor strip being positioned in overlying relation to said wave guide or on said one side of said wave guide, said second electrode means having a second conductor strip and a second set of a second plurality of second current conducting fin means spaced along said longitudinal axis of said second electrode means, each of said fin means of said second set of fin means being integral with and extending from said second conductor strip toward said first electrode means, ends of said fin means of said second set of fin means being positioned on said side of said waveguide opposite said one side, said first and second fin means being positioned relative to said waveguide to induce electro-optic action in said waveguide when voltage is applied to said electrode means.

2. An electro-optic modulator as defined in claim 1 wherein each of said fin means comprises a narrow fin extending from its conductor strip and a pad at its end remote from its said conductor strip, said pad terminating in an end edge remote from its said conductor strip, said end edge remote from said conductor strip being adjacent to said waveguide and substantially parallel to said longitudinal axis of said waveguide.

3. An electro-optic modulator as defined in claim 2 wherein said fin means of said first set of fins are positioned directly opposite to said fin means of said second set of fin means on opposite sides of said longitudinal axis of said waveguide.

4. An electro-optic modulator as defined in claim 2 wherein the length of each said pad measured in the direction of said longitudinal axis of said waveguide is substantially equal to between 40 and 60% of the length of the spacing between centers of adjacent fins (d) of a set of said fin means measured in said longitudinal direction of said waveguide.

5. An electro-optic modulator as defined in claim 1 wherein said waveguide is a ridge waveguide formed in a raised portion of said substrate, said raised portion being substantially parallel to said longitudinal axis and positioned between and in close relationship with end edges of said first and second sets of fin means remote from their respective said conductor strips.

6. An electro-optic modulator as defined in claim 2 wherein said waveguide is a ridge waveguide formed in a raised portion of said substrate, said raised portion being substantially parallel to said longitudinal axis and positioned between and in close relationship with end edges of said first and second sets of fin means remote from their respective said conductor strips.

7. An electro-optic modulator as defined in claim 6 wherein said end edges of said pads remote from said conductor strips of one set of fins are positioned adjacent to one side of said ridge waveguide and said end edges of said pads remote from said conductor strip of said second set of fin means are directly opposite said end edges of said pads of said one set of fins and are adjacent to a side of said ridge waveguide opposite said one side of said ridge waveguide.

8. An electro-optic modulator as defined in claim 1 wherein said substrate is formed of AlGaAs/GaAs or InGaAsP/InP.

9. An electro-optic modulator as defined in claim 1 wherein an optical buffer layer is interposed between said electrode means and said substrate.

10. An electro-optic modulator as defined in claim 2 wherein said substrate is formed of AlGaAs/GaAs or InGaAsP/InP.

11. An electro-optic modulator as defined in claim 2 wherein an optical buffer layer is interposed between said electrode means and said substrate.

12. An electro-optic modulator as defined in claim 3 wherein said substrate is formed of AlGaAs/GaAs or InGaAsP/InP.

13. An electro-optic modulator as defined in claim 3 wherein an optical buffer layer is interposed between said electrode means and said substrate.

14. An electro-optic modulator as defined in claim 4 wherein said substrate is formed of AlGaAs/GaAs or InGaAsP/InP.

15. An electro-optic modulator as defined in claim 4 wherein an optical buffer layer is interposed between said electrode means and said substrate.

16. An electro-optic modulator as defined in claim 5 wherein said substrate is formed of AlGaAs/GaAs or InGaAsP/InP.

17. An electro-optic modulator as defined in claim 5 wherein an optical buffer layer is interposed between said electrode means and said substrate.

18. An electro-optic modulator as defined in claim 6 wherein said substrate is formed of AlGaAs/GaAs or InGaAsP/InP.

19. An electro-optic modulator as defined in claim 6 wherein an optical buffer layer is interposed between said electrode means and said substrate.

20. An electro-optic modulator as defined in claim 7 wherein said substrate is formed of AlGaAs/GaAs or InGaAsP/InP.

21. An electro-optic modulator as defined in claim 7 wherein an optical buffer layer is interposed between said electrode means and said substrate.

* * * * *